(12) United States Patent  
Yokoi et al.

(10) Patent No.: US 7,949,862 B2  
(45) Date of Patent: May 24, 2011

(54) BRANCH PREDICTION TABLE STORING ADDRESSES WITH COMPRESSED HIGH ORDER BITS

(75) Inventors: Megumi Yokoi, Kawasaki (JP); Masaki Ukai, Kawasaki (JP); Takashi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/195,738

(22) Filed: Aug. 21, 2008

(65) Prior Publication Data

US 2008/0313446 A1    Dec. 18, 2008

Related U.S. Application Data

(63) Continuation of application No. PCT/JP2006/303770, filed on Feb. 28, 2006.

(51) Int. Cl.
*G06F 9/38* (2006.01)
(52) U.S. Cl. ........................ 712/239; 712/238
(58) Field of Classification Search .................. None
See application file for complete search history.

(56) References Cited

U.S. PATENT DOCUMENTS

| | | | | |
|---|---|---|---|---|
| 5,574,871 A | | 11/1996 | Hoyt et al. ................ | 395/376 |
| 5,701,448 A | * | 12/1997 | White ...................... | 712/233 |
| 5,706,492 A | | 1/1998 | Hoyt et al. ................ | 395/585 |
| 5,737,590 A | | 4/1998 | Hara ........................ | 395/585 |
| 5,867,698 A | | 2/1999 | Cumming .................. | 395/585 |
| 5,938,761 A | * | 8/1999 | Patel et al. ................ | 712/238 |
| 6,622,241 B1 | * | 9/2003 | Brockmann et al. ........ | 712/240 |
| 7,007,136 B2 | | 2/2006 | Yokoi et al. ............... | 711/133 |
| 2004/0003176 A1 | | 1/2004 | Yokoi et al. ............... | 711/128 |
| 2004/0003207 A1 | * | 1/2004 | Sunayama et al. .......... | 712/218 |

FOREIGN PATENT DOCUMENTS

| | | |
|---|---|---|
| EP | 0 770 954 | 5/1997 |
| JP | 7-210383 | 8/1995 |
| JP | 8-234980 | 9/1996 |
| JP | 9-311787 | 12/1997 |
| JP | 2004-38298 | 2/2004 |

OTHER PUBLICATIONS

*Dynamic Distinction of Distinguished Segments*, IBM Technical Disclosure Bulletin, IBM Corp., New York, NY, vol. 28, No. 9. Feb. 1, 1986, pp. 4065-4069 (5 pp.).
Extended European Search Report mailed Mar. 26, 2009 in corresponding European Patent Application No. 06714899.9 (8 pp.).
International Search Report dated Mar. 22, 2006 in corresponding International Application No. PCT/JP2006/303770 (1 pg).
International Preliminary Report On Patentability dated Sep. 2, 2008 in corresponding PCT Application No. PCT/JP2006/303770 (7 pp).

* cited by examiner

*Primary Examiner* — Kenneth S Kim
(74) *Attorney, Agent, or Firm* — Staas & Halsey LLP

(57) ABSTRACT

Address control section includes an encoding section to generate higher-order address information made by compressing a predetermined higher-order bit part from predetermined higher-order and lower-order bit parts included in an instruction address, and a restoring section to restore the higher-order bit part from the higher-order address information. Branch instruction predicting section includes a history memory section that stores the higher-order bit part and the lower-order bit part corresponding to a branch address of a processed branch instruction at either one of a plurality of storing places determined from the higher-order bit part and the lower-order bit part corresponding to a branch address of a processed branch instruction.

3 Claims, 11 Drawing Sheets

FIG. 2

| SECTION | 64-BITS ADDRESS | CODE |
|---|---|---|
| KERNEL/TEXT | 00000000:XXXXXXX | 00 |
| USER/TEXT | 00000001:XXXXXXX | 01 |
| USER/LIBRARY | FFFFFFFF:XXXXXXX | 11 |

| OTHERS | XXXXXXXX:XXXXXXX | 10 |
|---|---|---|

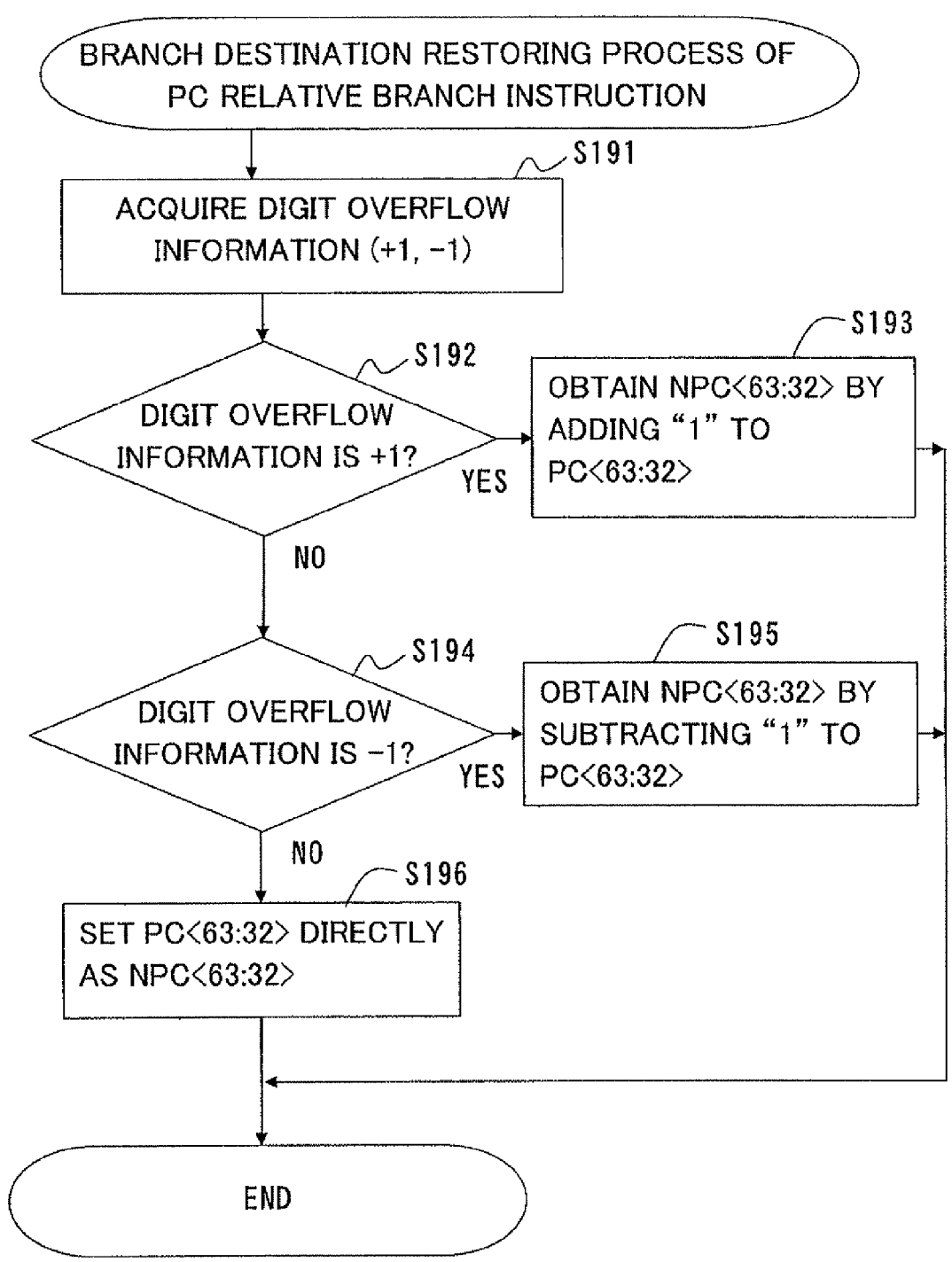

BRANCH PREDICTION TABLE STORING ADDRESSES WITH COMPRESSED HIGH ORDER BITS

CROSS-REFERENCE TO RELATED APPLICATION

This is a continuation of Application PCT/JP2006/303770, filed on Feb. 28, 2006 now pending, the contents of which are herein wholly incorporated by reference.

BACKGROUND

The specification relates generally to an information processor and more particularly to an instruction processor.

A branch prediction mechanism of an information processor predicts a branch destination in the case of executing a branch instruction next by managing an execution history of the branch instructions on the basis of storage addresses (which will hereinafter be termed instruction addresses) in a memory of the instructions executed in the past.

In this case, the branch prediction mechanism determines a set of a storage device in a set associative system from a bit field of a portion of the instruction address (a branch source address) of the branch instruction acquired (which means that the branch instruction is fetched) from a storage source in the past. Then, the branch prediction mechanism stores a branch destination address in one way within the set by tagging still another bit field of the branch source address.

Then, the branch prediction mechanism searches the storage device by using the instruction address at an instruction fetch stage. Then, if the branch destination address of the branch instruction that was already executed in the past is stored in the storage device, the branch prediction mechanism can obtain the branch destination address from the way showing coincidence with a content of the tag within the relevant set. Namely, the branch prediction mechanism can determine in parallel with the instruction fetch whether the instruction is the branch instruction or not (whether or not the branch destination address is stored by tagging a portion of the instruction address of the branch source).

Namely, this technique enables the information processor, in parallel with the instruction fetch, to determine whether the instruction is the branch instruction or not by acquiring an address of a now-being-fetched instruction and to obtain the branch destination address predicted if the instruction is the branch instruction. Accordingly, the information processor can, even when performing a pipeline process, prepare the instruction fetch at a next stage from the branch destination predicted beforehand in parallel with the present instruction fetch.

Then, if the branch destination obtained from the now-being-fetched instruction is the predicted branch destination, the parallel operations at the respective stages can be conducted without stopping the pipeline process. Whereas if the branch destination obtained from the now-being-fetched instruction is not the predicted branch destination, it follows that the instruction fetch from a correct branch destination resumes. If the branch destination is not stored in the storage means in the manner of being associated with the instruction address of the now-being-fetched branch instruction (if the branch instruction is executed though the branch prediction is not hit) also, the branch prediction can not be utilized, and it follows that there resumes the instruction fetch from the branch destination address acquired by decoding the post-fetching branch instruction.

By the way, in the information processor, a space stored with the instruction has hitherto been a 32-bits address space. However, some information processors exist, in which the address space is extended to 64 bits corresponding to an increase in size of data to be processed. In this type of information processors, an instruction space as well as the data space is organized into 64 bits.

A size of an actual program is much smaller than 4 GB (even the largest program is on the order of several hundreds of megabits (MB)), and all the complete address for 64 bits is stored in or processed by a speculative execution processing unit, which is said to be futile in terms of hardware resources.

It is therefore efficient to organize only an inevitable portion into 64 bits, which is defined in an instruction set architecture. Such being the case, a control unit for controlling an instruction fetch speculatively based on the branch prediction uses a low-order 32-bits address to the greatest possible degree and thus controls the same instruction fetch etc as those conventional.

A specific method is that the high-order 32-bits address is fixed beforehand, and the instruction is fetched by using the fixed high-order 32-bits and a 4G bytes space of the low-order 32-bits. Then, a thinkable scheme is that if over the 4G bytes space, the high-order 32-bits are redefined.

To be specific, the high-order 32-bits of the program counter are normally fixed. Then, when there occurs such an event as to change the high-order 32-bits of the program counter by the branch instruction, exception and interruption which vary the high-order 32-bits, the high-order 32-bits are again obtained. In this case, with completion of the instruction (event) that changes the high-order 32-bits, an instruction fetch/instruction execution pipeline undergoing a speculative process is once completely cleared.

Therefore, after rewriting the high-order 32-bits of the program counter into a new value, the instruction fetch resumes with this new address. Namely, there is the event that changes the high-order 32-bits, a privilege of the speculative execution can not be received at all. Even in such a case, there must be no problem as far as the program size is small. An actual OS, however, performs control of utilizing plural sets of high-order 32-bits of the 64-bits instruction address even when the program size to be allocated is small.

In this case, a possibility that the programs disperse in the 64-bits virtual memory space is not denied. If so, even when the individual program is small, the branches over the 32-bits based 4G bytes address might frequently occur due to the branch instructions.

SUMMARY

According to a conventional method, it follows that whenever over the 32-bits based 4G bytes address, the speculative instruction fetch comes into a failure for a period till the high-order 32-bits are redefined. For example, supposing that there is the branch instruction over the 4G bytes, even when the low-order 32-bits are correctly predicted by the branch prediction mechanism, the high-order 32-bits remains old, resulting in a mis-prediction.

The failure in the speculative instruction fetch implies a resultant failure in all the speculative execution, and a loss thereof is incalculable. For obtaining higher performance by improving this point, it is considered that the branch prediction etc is conducted by making complete use of the 64-bits address in all portions. As described above, however, this scheme is not a real solution when taking a cost and a clock cycle into consideration. It is an object of the embodiment to solve the problems inherent in the prior arts.

The embodiment adopts the following means in order to solve the problems given above. Namely, the embodiment illustrates a processor comprising: a fetching unit fetching instructions at a fetching stage of a computer that repeats an execution cycle including at least the fetching stage for fetching the instructions from an instruction storage source and an execution stage for processing the instructions; an address control unit determining an instruction address defined as a storage source of the instruction fetched by the fetching unit; a branch instruction predicting unit predicting, based on history information of the instructions processed in the past, whether the instruction processed by the computer at a next execution stage is a branch instruction or not; and an execution unit processing at least one of the fetched instructions at the execution stage. The address control unit includes an encoding unit generating high-order address information by compressing the high-order bit field among a predetermined high-order bit field and a predetermined low-order bit field each contained in the instruction address and a restoring unit restoring the high-order bit field from the high-order address information. The branch instruction predicting unit includes a history storage unit storing the high-order address information and the low-order bit field as history information associated with a branch destination address of the processed branch instruction in any one of a plurality of storage locations that is determined from the high-order address information and the low-order bit field associated with the instruction address of the storage source of the branch instruction.

According to the processor, the high-order address information and the low-order bit field associated with a branch destination address of the processed branch instruction are stored as history information in any one of a plurality of storage locations that is determined from the high-order address information and the low-order bit field associated with the instruction address of the storage source of the branch instruction. In this case, the high-order address information is compressed information of the high-order bit field. Accordingly, even when an instruction address length is extended and an address space is expanded, the information associated with the branch destination address can be efficiently managed based on the compressed high-order address information and the low-order bit field. Note that "processing the instruction" herein connotes "executing a predetermined process in accordance with the instruction", and includes, e.g., in the case of a conditional branch instruction, determination of a condition and a process of branching or not branching to the branch destination on the basis of a result of the determination.

The encoding unit may segment the high-order bit field into a plurality of address ranges, and generates first high-order address information for identifying a first segmented address range and second high-order address information for identifying the address ranges excluding the first address range. And if the branch destination address of the branch instruction represents a branch instruction branching to the first address range identified by the first high-order address information, the address control unit may generate the high-order bit field associated with the first address range through the restoring unit. And if the branch instruction is a branch instruction branching to an address range identified by the second high-order address information, the address control unit may restore the high-order bit field corresponding to a type of the branch instruction.

According to the present processor, the high-order bit field is segmented into the plurality of address ranges. Then, if the branch destination address falls within the first address range identified by the first high-order address information, the high-order bit field associated with the first address range is generated. On the other hand, if the branch destination address falls within the address range identified by the second high-order address information, the high-order bit field is restored corresponding to the type of the branch instruction. Hence, for instance, if the branch instruction to a specified address range frequently occurs, this address range is identified by the first high-order address information, and, with this scheme, the high-order bit field associated with this address range can be effectively generated.

The address control unit may include: a branch type information receiving unit receiving from the execution unit, a signal for identifying a type of the branch instruction if the branch instruction is the branch instruction branching to the address range identified by the second high-order address information; a digit overflow information receiving unit receiving digit overflow information showing occurrence of a digit overflow in a positive direction or in a negative direction from the range of the low-order bit field in a process of the branch instruction by the execution unit if the branch instruction is a relative branch instruction relatively branching from a branch source address in a way that sets the range of the low-order bit field as a limit; and an operation unit acquiring the high-order bit field of the branch destination address by addition or subtraction to or from the high-order bit field of the branch source address if the digit overflow occurs.

According to the present processor, if the branch instruction is the branch instruction branching to the address range identified by the second high-order address information, and if the branch instruction is the relative branch instruction relatively branching from the branch source address in a way that sets the range of the low-order bit field as the limit, the high-order bit field of the branch destination address can be acquired by the addition or the subtraction to or from the high-order bit field of the branch source address. Namely, the digit overflow in the positive direction or in the negative direction from the range of the low-order bit field is detected, and an amount of the digit overflow may be added to or subtracted from the high-order bit field.

The address control unit may include a high-order bit acquiring unit acquiring, if the branch instruction is not the relative branch instruction, the high-order bit field of the branch destination address from the operation unit that has calculated the branch destination of the branch instruction.

According to the present processor, if the branch instruction is the branch instruction branching to the address range identified by the second high-order address information, and if the branch instruction is not the relative branch instruction, the high-order bit field can not be acquired by adding or subtracting the amount of digit overflow to or from the high-order bit field. In this case, the high-order bit field of the branch destination address can be acquired from the operation unit that calculates the branch destination.

If the address space is expanded, and if there is an uneven distribution in the high-order bits used in the expanded address space, the branch prediction can be efficiently realized.

BRIEF DESCRIPTION OF THE DRAWINGS

FIG. 2 is a diagram illustrating definitions of high-order 32-bits definition codes;

FIG. 11 is a diagram illustrating the branch destination restoring process of a PC relative branch instruction.

DETAILED DESCRIPTION

A processor according to a best mode (which will hereinafter be termed an embodiment) will hereinafter be described with reference to the drawings. A configuration in the following embodiment is an exemplification, and the processor is not limited to the configuration in the embodiment.

<<General Description>>

A 64-bit address space is designed adaptively to convenience of a 64-bit extension in a data space, and hence an address, in which a string of instructions are actually allocated within the space, includes an uneven distribution at the present. Such being the case, high-order 32 bits are expressed pseudowise by minority bits in a way that utilizes the uneven distribution. Namely, a frequently occurring high-order address is estimated and expressed by codes using the minority bits.

The minority bits are added to low-order 32 bites, and the low-order 32 bits combined with the minority bits are treated as an address for conducting a branch prediction, whereby this scheme can correspond to allocation to the 64-bit address space of a program simply by adding a slight extension to the conventional apparatus (this type of allocation to the address space of the OS-based process will hereinafter be referred to as a 64-bit address mode). Namely, for example, even when the OS performs control to utilize the 64-bit address space, the efficient branch prediction can be done by utilizing the uneven distribution of the address to which to make reference.

The frequently occurring high-order address may be predicted from specifications of the OS and fixedly determined, and is also, it is considered that, dynamically set by providing an address frequency counter.

Figure 1:
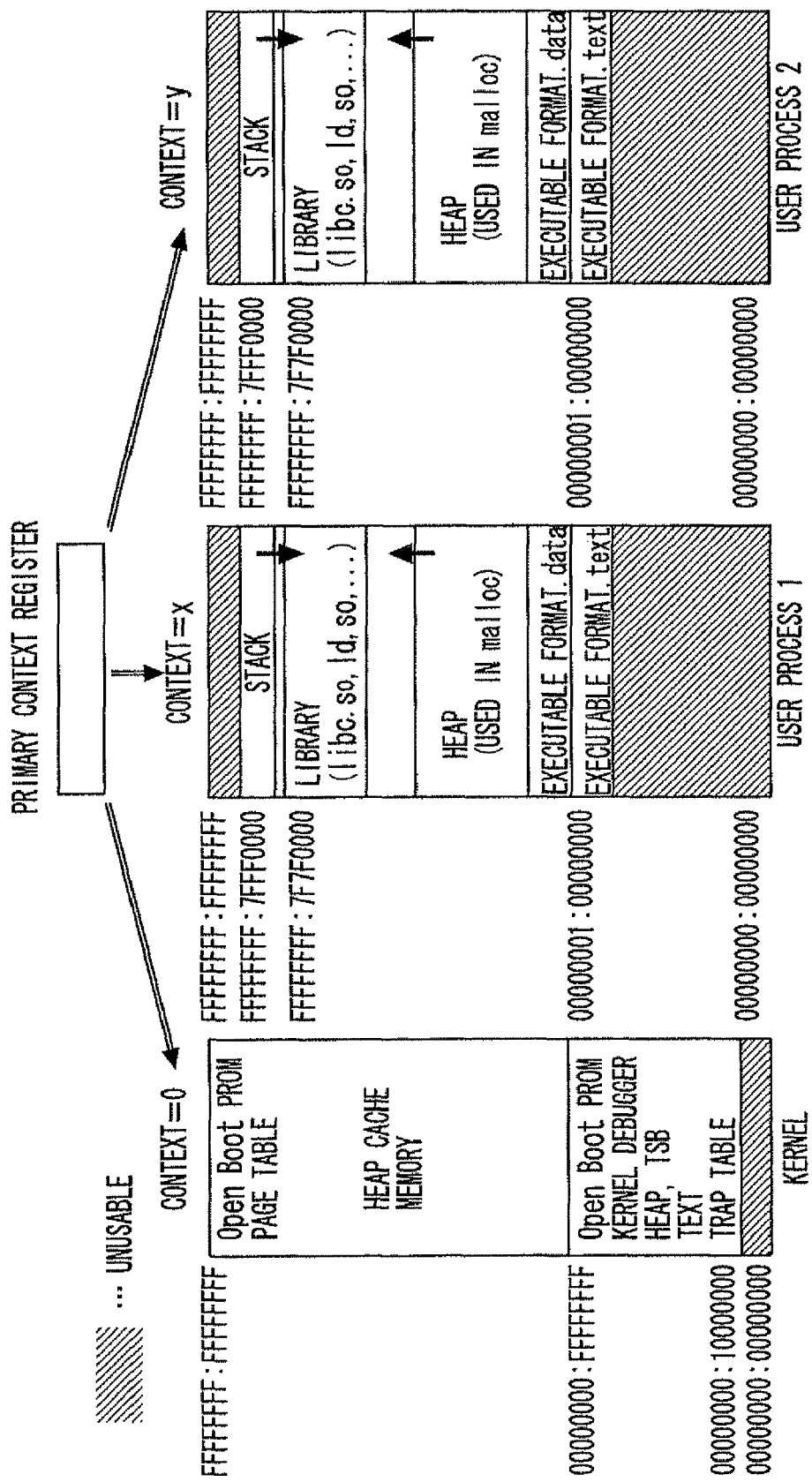
FIG. 1 is a diagram illustrating an image of a process allocated to a 64-bit address space.

In the OS over the recent years, the 64-bit address space as in FIG. 1 is defined (refer to, e.g., a reference document "Solaris Internals" (Pearson Education)).

FIG. 1 is a diagram illustrating an image of processes allocated to the 64-bit address space. In FIG. 1, regions depicted by oblique lines (hatching) represent address regions in which any processes can not be used. As in FIG. 1, under a general type of OS control, the address spaces (virtual address spaces) are separately prepared for the kernel and the user process.

For example, the OS address space defined as an address space in the kernel mode ranges from 0000000:00000001 to 0000000:FFFFFFFF (where 0, 1, F, etc are hexadecimal numbers. This notation is hereinafter the same. Herein, the digits are delimited by a colon for every 32 bits). Further, regions after 0000001:00000000 are a heap region and a cache region.

Moreover, in the user space, a text space stored with an executable format starts from 00000001:0000000. Further, a stack region extends from FFFFFFFF:7FFFC000 to FFFFFFFF:7F7F000. Moreover, a library is stored in an address diminishing direction from FFFFFFFF:7F7F000.

The following points are understood from FIG. 1.

(1) In the OS kernel region, the high-order 32 bits are given by 0x00000000.

(2) In the text (a program in the execution format) regions, the high-order 32 bits are given by 0x00000001.

(3) The library, with the high-order 32 bits starting from 0xFFFFFFFF, descends in sequence.

The number of the libraries used for a general type of application is on the order of 10 at the maximum, and a single unit of library has a small size, so that the libraries, even if combined in all, normally fall within a range with no change of the high-order 32 bits.

Hence, the frequently occurring high-order 32-bits addresses are considered as the following three types.

0x00000000 (the hexadecimal number; eight pieces of 0)

0x00000001 (the hexadecimal number; seven pieces of 0, and one piece of 1)

0xFFFFFFFF (the hexadecimal number; eight pieces of F)

Then, in place of the high-order 32-bits address, codes for respectively identifying the three types of high-order addresses and "high-order addresses" other than those, are introduced. The codes are registered together with the low-order 32-bits address in the branch prediction apparatus. When fetching the instruction having the predicted branch destination address, the original high-order 32-bits address is generated from the code and then employed. If the code is applied not to any one of the three types of frequently occurring addresses but to "the high-order address other than those", the high-order bits are unknown, and hence the operation may be redone from a stage of correctly calculating the high-order address. With this scheme, though resulting in "Over 4G=Failure in Speculative Fetch" so far, a possibility of succeeding in the speculative fetch comes out in the same way as within the conventional 32-bits range with respect to at least the three types of high-order addresses.

Considering that a great majority of instructions are embraced by the three types of addresses and that transitions between the three regions are frequent in their own ways while there being almost no possibility of transiting to regions other than the three regions, tremendous improvement of the performance will be estimated in the 64-bits address mode. Further, the performance does not decline in the conventional 32-bits application.

FIG. 2 shows definitions of the codes (which will hereinafter be termed high-order 32-bits definition codes). As in FIG. 2, when the high-order 32-bits address is "0x00000000", the high-order 32-bits definition code is set to 00(b) ((b) represents "being the bit data", and the same notation will hereinafter be applied.). Further, when the high-order 32-bits address is "0x00000001" the high-order 32-bits definition code is set to 01(b). Moreover, when the high-order 32-bits address is "0xFFFFFFFF", the high-order 32-bits definition code is set to 11(b). Still further, when the high-order 32-bits address is excluded from those given above, the high-order 32-bits definition code is set to 10(b).

Thus, the present processor executes the branch prediction process with the high-order 32-bits definition code given by "the low-order 32-bits address+2 bits". The present processor, unless an over-32-bits branch instruction occurs, executes the branch prediction with the totally 34-bits pseudo address.

Moreover, when the high-order 32-bits definition code is 00(b), 01(b) or 11(b), the high-order 32-bits are fixed to 01x00000000, 01x00000001 and 01xFFFFFFFF, respectively. Accordingly, the conventional branch prediction technique within the 32-bits range is applied as it is to the branch prediction in this case, and, so to speak, the branch prediction with the 34-bits address is carried out.

On the other hand, the high-order 32-bits definition code is 10(b), this connotes that the branch destination exceeds the 32-bits address range and that the high-order 32-bits come under none of the three types given above. In this case, the high-order 32-bits address is unknown. Such being the case, what is done is an operation based on an assumption that the present high-order 32-bits of the PC are used as they are when the high-order 32-bits definition code for the branch prediction becomes "10", i.e., the 32-bits prediction itself is done.

Thus, the present processor can, within the ranges of the three regions (the address ranges in which the high-order 32-bits addresses are specified by the high-order 32-bits definition codes 00(b), 01(b) and 11(b)) and with respect to the branches between the three regions, apply the conventional 32-bits based branch prediction means in a way that translates the address into the 34-bits address (the high-order 32-bits definition code+the low-order 32-bits address).

On the other hand, if the branch to the region beyond the three regions occurs, i.e., if the branch to the high-order 32-bits range specified by the high-order 32-bits definition code 10(b) occurs, there arises a necessity for accurately obtaining again the high-order 32-bits by applying the conventional technique.

It is rare that the program region (each of the OS region, the text region and the library region) is used in excess of the 32-bits address range (4 GB), and therefore the branch prediction can be executed in the 34-bits range in the majority of processes.

Figure 3:
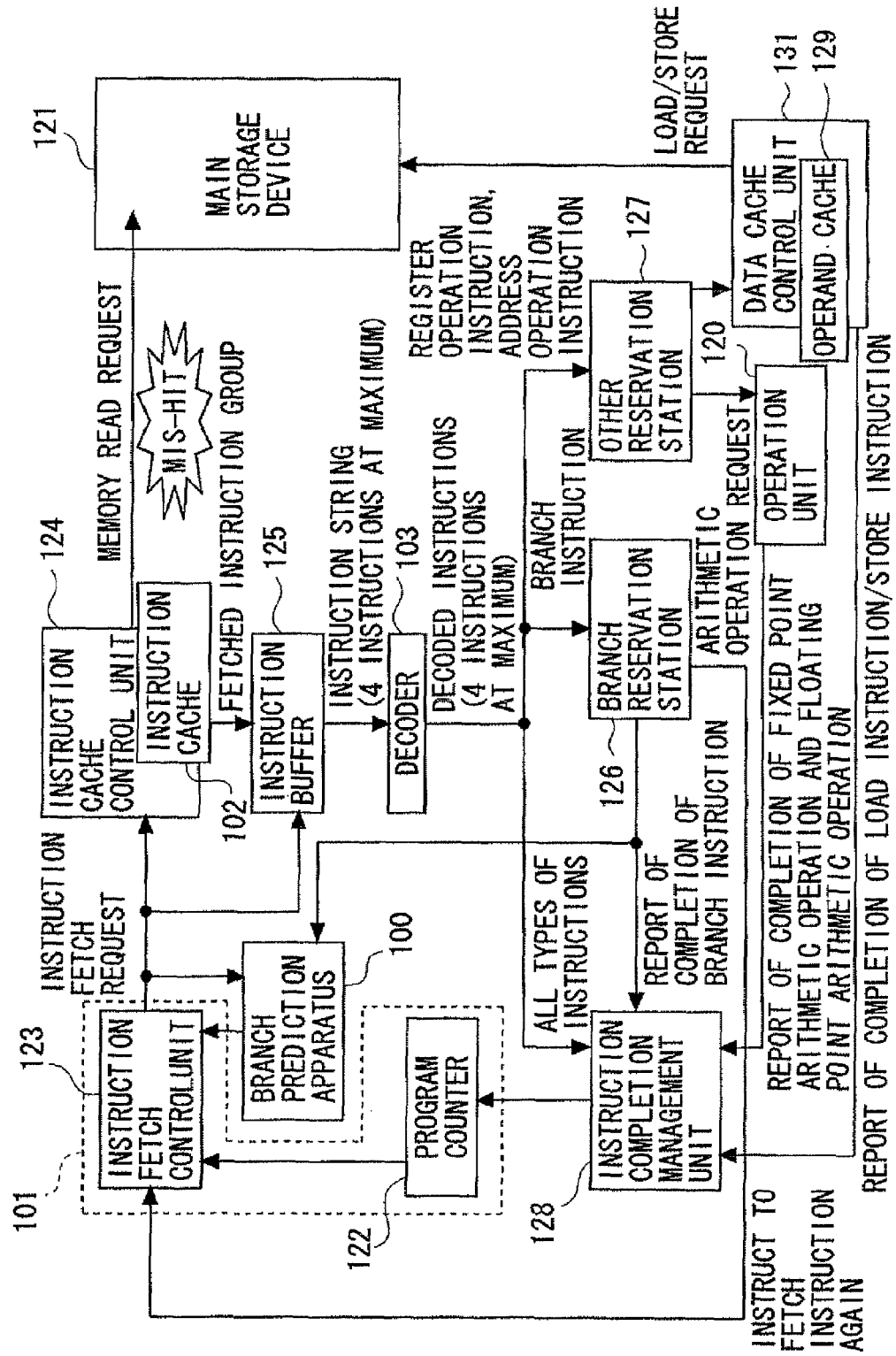
FIG. 3 is a diagram of a system architecture of a processor according to an embodiment.

FIG. 3 is a diagram of a system architecture of the present processor. The present processor is a so-called stored-program computer that reads and executes instructions stored in, e.g., a main storage device 121.

As in FIG. 3, this processor includes an operation unit 120 which executes the instructions, the main storage device 121 stored with the instructions executed by the operation unit 120 and data etc that is processed by the operation unit 120, and a program counter 122 that designates an address on the main storage device 121 of the instruction that should be executed by the operation unit 120. Control of the processor based on the control of this type of program counter 122 is widely known.

In FIG. 3, the processor includes, more specifically, an instruction fetch control unit 123 that controls an instruction fetch based on the address generated by the program counter 122, an instruction cache control unit 124 which manages the instruction cache 102 and fetches the instruction in response to an instruction fetch request given from the instruction fetch control unit 123, an instruction buffer 125 that retains the instruction fetched from the instruction cache 102, the decoder 103 that decodes the instruction in the instruction buffer 125, a reservation station (including a branch reservation unit 126 which controls the execution of the branch instruction and other reservation unit 127 which controls execution of a register operation instruction and execution of an address operation instruction) which controls timing of executing the decoded instructions, an instruction completion management unit 128 that monitors completion of the execution of the instruction, an operand cache 129 which supplies fast the operation unit 120 with an operand of the instruction executed by the operation unit 120, and a data cache control unit 131 which manages how the data is transferred and received between the main storage device 121 and the operand cache 129.

Figure 5:
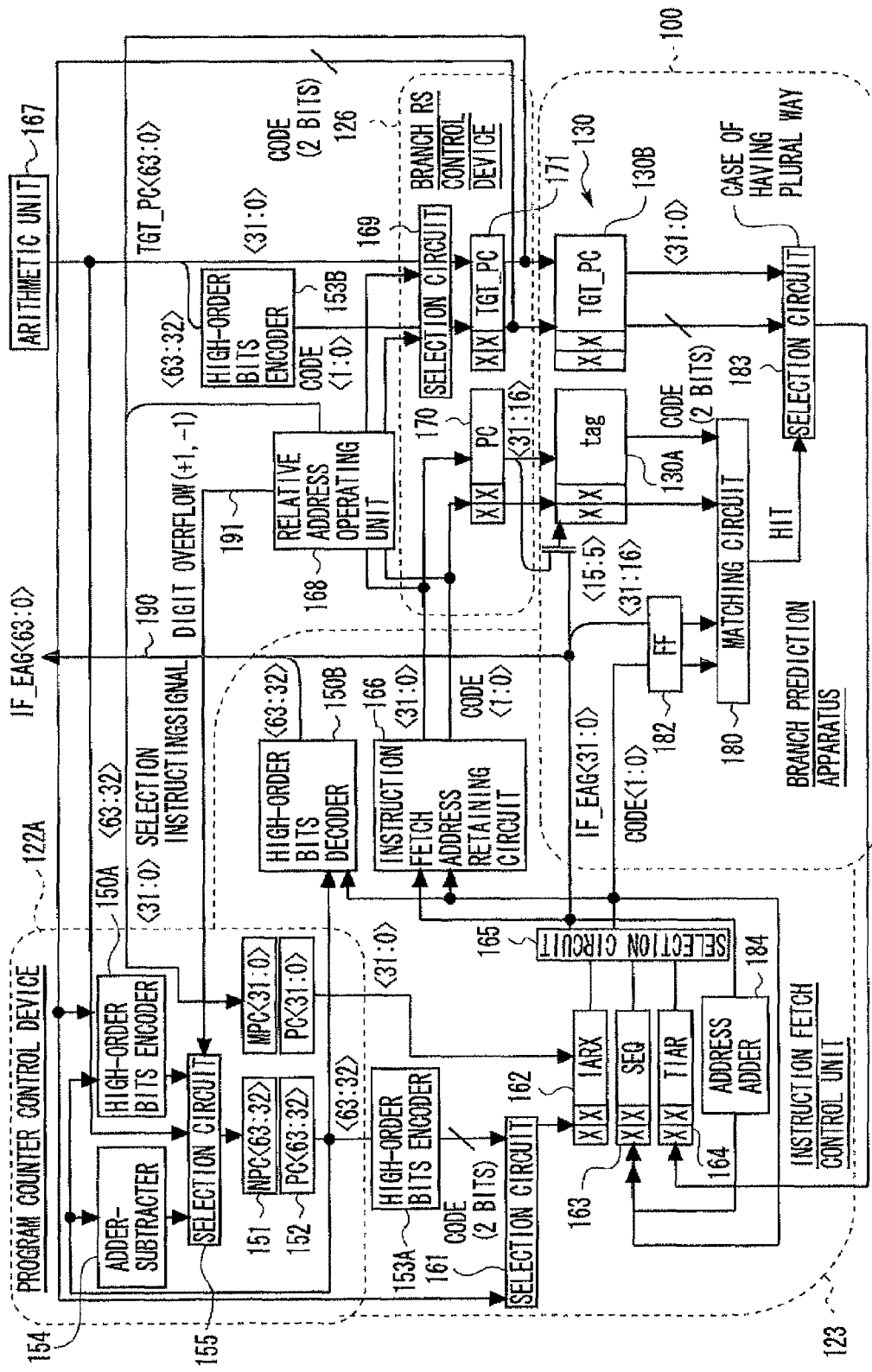
FIG. 5 is a diagram illustrating a detailed configuration of the processor.

Among those components, the branch prediction apparatus 100 includes a branch history storage device 130 stored with branch histories of the branch instructions (see FIG. 5). The branch history storage device 130 is a storage device in a 4-way set associative system.

Figure 4:
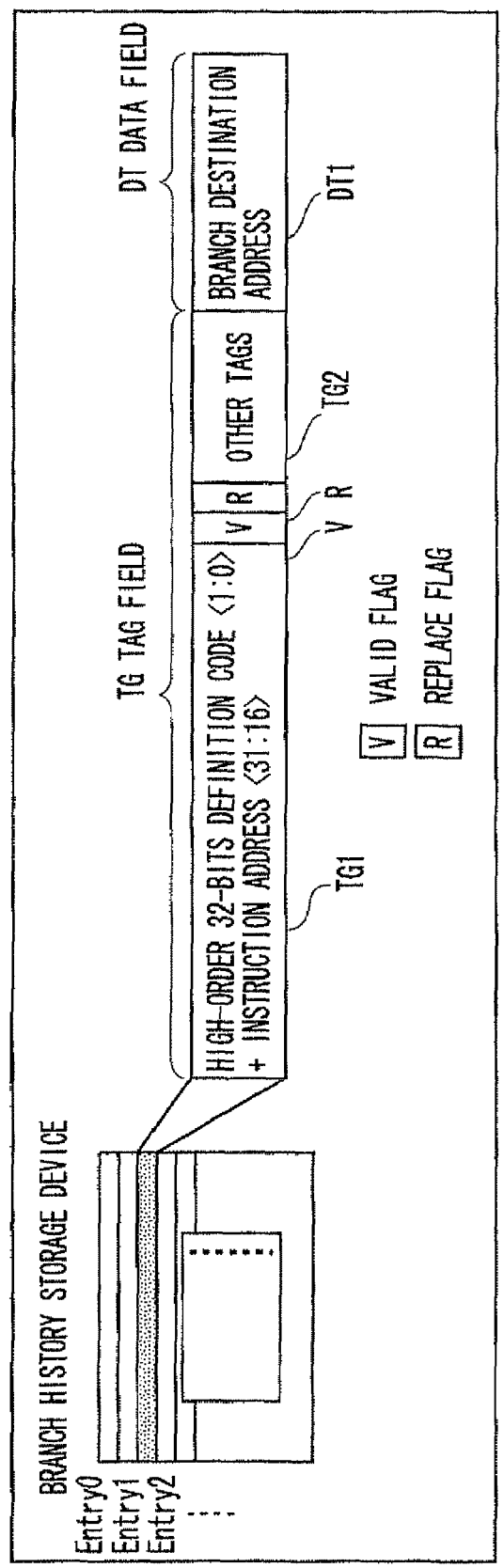
FIG. 4 is an explanatory diagram illustrating a structure of each of ways organizing a set in a branch history storage device.

FIG. 4 is an explanatory diagram illustrating a structure of each of the ways organizing a set in the branch history storage device 130. The branch history storage device 130 is a comparatively fast accessible storage device such as a SRAM (Static Random Access Memory). The 4-way branch history storage device 130 has entries associated with 4 ways within one set. As illustrated in FIG. 4, each entry includes a tag field TG and a data field DT. The tag field TG is structured by (a part of) an instruction address TG1, a valid flag V, a replace flag R and other flag TG2. The data field DT is structured by a branch destination address DT1 defined as predetermined data.

One set is determined by a portion (e.g., <15:5>) of the instruction address output from the address generating unit 101. The first embodiment adopts the 4-way scheme, and hence it follows that the determination of the set leads to designation of 4 entries. Further, one of the 4 entries is determined by another portion of the instruction address.

In the present processor, the determination of this one entry involves storing the high-order 32-bits definition code <1:0> and the portion (e.g., <31:16>) of the instruction address in the instruction address TG1. For example, when registered, the set is determined by use of a portion <15:5> of the instruction address, and the remaining portions are stored as data in the tag field (containing the instruction address TG1) of any one of the entries (any one of the 4 entries associated with the 4 ways) within the set. Note that the description of the instruction address <31:16> represents a portion of the instruction address (e.g., 32 bits) that occupies the 31st bit through the 16th bit.

Accordingly, in the present processor, the tag employed when searching for the 4 entries within one set involves using the high-order 32-bits definition code (any one of codes such as 00(b), 01(b), 11(b) and 10(b)) and the portion <31:16> of the low-order 32-bits address.

The valid flag is a flag showing whether the entry is valid or invalid. For example, if the valid flag is "1", this indicates that the entry containing this valid flag is valid. If the valid flag is "0", this indicates that the entry containing this valid flag is invalid. An implication of the entry being valid is that the branch destination address defined as the data registered in the way is not deleted. The valid flag is employed also for selecting the replacement target way.

The replace flag is a flag used for selecting the replacement target way. The branch destination address is stored with a branch destination address of a branch instruction fetched from the cache memory 102 (or the main storage device 121). In the present embodiment, in-depth descriptions of the processes of the replace flag and the valid flag are omitted.

A control procedure of the present processor will hereinafter be described. To start with, the program counter 122 sends the instruction address (which is the address on the main storage device 121 stored with the instruction) to the instruction fetch control unit 123.

The instruction fetch control unit 123 instructs the instruction cache control unit 124 to fetch the instruction specified by the instruction address, and also instructs the branch prediction apparatus 100 to predict the branch. Then, in parallel with the instruction fetch process in the instruction cache 102, a search through the branch history storage device 130 of the branch prediction apparatus 100 is made.

Then, the branch prediction apparatus 100, when the branch instruction is hit with the present instruction address, sends the branch destination address to the instruction fetch control unit 123.

The instruction fetch control unit 123 further instructs, based on the branch destination address of the branch instruction hit by the branch prediction apparatus 100, the instruction cache control unit 124 to fetch a next instruction (this type of process normally organizes a stage of a pipeline). Note that if the branch prediction is not hit, a next instruction address with no branch is generated by an address adder 184 included within the instruction fetch control unit 123, and the instruction cache control unit 124 is instructed to fetch the next instruction.

The fetched and decoded instruction, if not the branch instruction, waits in an execution standby status on the basis of the processing of the operand by the other reservation station 127. Then, just when coming to a complete set of operands, the respective instructions are executed by the operation unit 120.

On the other hand, the branch reservation station 126 queues the branch instructions. Then, the branch reservation station 126, when the branch destination address is determined by executing the branch based on the branch instruction, sends a report of completion to the instruction completion management unit 128 and the branch prediction apparatus 100.

At this time, the branch reservation station 126 determines whether the branch prediction is correct or not. To be specific, in a case (a1) where the branch prediction is hit with the instruction address by the branch prediction apparatus 100 (the branch destination address is stored in the branch history storage device 130) and in a case (a2) where the fetched branch instruction branches to the branch destination address, the branch prediction proves to be correct. Alternatively, in a case (b1) where the branch prediction is not hit with the instruction address by the branch prediction apparatus 100 and in a case (b2) where the fetched instruction is not the branch instruction or if not branched even when being the branch instruction, the branch prediction proves to be correct.

In this case, it follows that the instruction fetch, which has already been requested of the cache control unit 124, continues as it is.

Further, if the branch prediction is incorrect, it follows that there are interrupted the instruction fetch, which has already been requested of the cache control unit 124, and a series of processes subsequent thereto. Simultaneously, the branch reservation station 126 instructs the instruction fetch control unit 123 to fetch again the instruction from the correct branch destination.

The branch prediction apparatus 100 stores the way with the executed branch instruction via the selector 132.

Note that there are a case in which the branch instruction branches to the branch destination through the execution of the instruction and a case in which the program counter shifts to the next address without being branched. Then, according to the present embodiment, a phrase "the execution of the instruction" is called "processing the instruction". The "the execution of the instruction" connotes execution of a predetermined process based on the instruction and embraces, e.g., in the case of a conditional branch instruction, a process of branching or not branching to the branch destination based on determination of a condition and a result of the determination.

WORKING EXAMPLES

The processor according to one working example will hereinafter be described with reference to the drawings in FIGS. 5 through 11. FIG. 5 is a diagram showing a detailed configuration of the processor according to the working example. FIG. 5 explicitly illustrates, in the present processor, particularly a program counter control device 122A (corresponding to an address control unit), an instruction fetch control unit 123 (corresponding to a fetching unit), a branch reservation station 126, the branch prediction apparatus 100 (corresponding to a branch prediction unit) and operation units (which are a relative address operation unit 168 and an operation unit 167, and correspond to an execution unit). The respective units, i.e., the components, of the present processor will hereinafter be described.

(Program Counter Control Device 122A)

The program counter control device 122A controls a calculation of a next value NPC151 of the program counter on the basis of a present value PC152 of the program counter (or based on a result of executing the branch instruction).

FIG. 5 shows the present value PC152 of the program counter in separation into a high-order 32-bits PC <63:32> and a low-order 32-bits PC<31:0>. A notation "PC152", however, represents the present value itself (all of the bits) of the program counter.

Similarly, the next value NPC151 of the program counter is similarly shown in separation into a high-order 32-bits NPC <63:32> and a low-order 32-bits NPC <31:0>. A notation "NPC152", however, represents the next value itself (all of the bits) of the program counter.

As in FIG. 5, the branch instruction is processed, and the branch destination address is determined, in which case the branch reservation station 126 sends the high-order 32-bits definition code, digit overflow information of the branch destination address and the low-order 32-bits address. Herein, "the digit overflow information of the branch destination address" (which will hereinafter be simply termed the digit overflow information) is information showing, when a PC relative branch instruction is branched, whether a relative address to the branch destination exceeds a low-order 32-bits range or not.

The following discussion will deal with the digit overflow information. In the present processor, the branch instruction can be classified into the PC relative branch instruction and a register indirect branch instruction.

The PC relative branch instruction is a branch instruction using, as an operand, a relative branch address with respect to the present value of the program counter. The branch destination of the PC relative branch instruction is an address into which the relative branch address is added to the present value of the program counter. In the case of the present embodiment, the relative branch address defined as the operand is within the range enabling the description to be made with the 32 bits at the maximum. Hence, when the PC relative branch instruction is branched, the high-order 32-bits of the branch destination come to a +1 status at the maximum (a digit overflow status in a positive direction) and come to a −1 status at the minimum (a digit overflow status in a negative direction).

In the present embodiment, the branch reservation station 126 notifies the program counter control device 122A of a bit (+1 bit) showing the digit overflow status in the positive direction and a bit (1 bit) showing the digit overflow status in the negative direction. The program counter control device 122A receiving these signals corresponds to an information receiving unit.

Moreover, when the PC relative branch instruction is executed, the relative address operation unit 168 notifies the program counter control device 122A of a signal showing this execution (line 191). The program counter control device 122A receiving this signal corresponds to a branch type information receiving unit.

On the other hand, the register indirect branch instruction is a branch instruction in which a register number is designated as the operand, and the address stored in the designated register is set as the branch destination address. The register indirect branch instruction enables the branch destination address to be designated with a bit width of the register, i.e., in a 64-bits range.

As in FIG. 5, the program counter control device 122A includes a high-order bit decoder 150A. The high-order bit decoder 150A has a function of returning the high-order 32-bits definition code to the original high-order 32-bits address (a high-order bit decoder 150B has the same function).

The high-order bit definition code is inputted from the branch reservation station 126. This operation intends to finalize the next branch destination in the branch reservation station 126. A buffer TGT-PC171 included in the branch reservation station 126 is stored with the high-order 32-bits definition code of the branch destination address to which the instruction is decoded and determined to be branched and stored with the low-order 32-bits address. The high-order 32-bits definition code of this determined branch destination address is inputted to the high-order bit decoder 150A.

The decoder 150A in the present embodiment translates the high-order 32-bits definition code into the high-order 32-bits address at all times. Moreover, when receiving notification that completion of executing the branch instruction has been confirmed from the instruction completion management unit 128 (see FIG. 3), the high-order 32-bits of the determined branch destination address is set in the next value NPC151 of the program counter.

Accordingly, the high-order 32-bits definition code is 00(b), 01(b) or 11(b) even when the branch instruction occurs, in which case the high-order 32-bits decoder 150A of the program counter control device 122A generates the high-order 32-bits address directly from the high-order 32-bits definition code. This is because the high-order 32-bits can be uniquely determined from the high-order 32-bits definition code.

Further, with respect to the low-order 32-bits address, the program counter control device 122A receives the low-order 32-bits TGT_PC<31:0> of the determined branch destination address from the branch reservation station 126 and sets TGT_PC<31:0> into the low-order 32-bits NPC<31:0> of the next value of the program counter. Thus, even when the branch instruction occurs, the high-order 32-bits of the branch destination address can be uniquely determined from the high-order 32-bits definition code, and in this case the program counter comes to set the correct branch destination address by restoring the address from the high-order 32-bits definition code.

On the other hand, when the high-order 32-bits definition code is 10(b) (other cases), the program counter control device 122A temporarily determines that the branch destination based on the branch instruction exceeds the range of the address that is uniquely defined by the high-order 32-bits definition code (the program counter control device 122A, which executes this determination, corresponds to a determining unit). In this case, the branch destination address can not be restored by the high-order 32-bits definition code. The present embodiment selects a method of restoring the branch destination address, corresponding to the type of the branch instruction.

The following is a description of a method of generating the branch destination address if the high-order 32-bits of the branch destination address can not be generated from the high-order 32-bits definition code.

To begin with, when the branch instruction is the PC relative branch instruction, the relative branch operation unit 168 notifies the program counter control device 122A of a signal (e.g., HI signal) showing this purport via the line 191. In this case, the program counter control device 122A reads the digit overflow information from the branch reservation station 126. Then, the high-order 32-bits of the branch destination address are generated in a way that adds a change to the high-order 32-bits of the present value PC152 of the program counter on the basis of the digit overflow information.

FIG. 11 shows a flow of a branch destination restoring process of the PC relative branch instruction.

If the digit overflow information is "+1" (S192), the program counter control device 122A sets, as the high-order 32-bits of the branch destination address, a value obtained by adding "1" to the high-order 32-bits PC <63:32> of the present value of the program counter through an adder-subtracter 154 (S193). If the digit overflow information is "−1" (S194), the program counter control device 122A sets, as the high-order 32-bits of the branch destination address, a value obtained by subtracting "1" from the high-order 32-bits PC<63:32> of the present value of the program counter through the adder-subtracter (S195). Moreover, If the digit overflow information is neither "+1" nor "−1", the program counter control device 122A sets the high-order 32-bits PC<63:32> of the present value of the program counter directly as the high-order 32-bits of the branch destination address (S196). The adder-subtracter 154 executing this process corresponds to an operation unit.

On the other hand, the value TOT PC<31:0> sent from the branch reservation station 126 is set intactly in the low-order 32-bits of the branch destination address.

Next, if the branch instruction is the register indirect branch instruction, the relative branch operation unit 168 notifies the program counter control device 122A of a signal (e.g., LO signal) showing this purport via the line 191. In this case, the program counter control device 122A can not specify the high-order 32-bits of the branch destination address from the high-order 32-bits <63:32> of the present value PC of the program counter.

In this case, the operation unit 167 inputs the branch destination address of the register indirect branch instruction to the program counter control device 122A. Herein, the operation unit 167 is an operation unit that calculates the branch destination address of the register indirect branch instruction. Then, the program counter control device 122A reads the high-order 32-bits address directly from an output of the operation unit 167 which has calculated the branch destination address of the register indirect branch instruction, and sets this readout address as the high-order 32-bits of the branch destination address.

On the other hand, the value TGT_PC<31:0> sent from the branch reservation station 126 is set intactly in the low-order 32-bits of the branch destination address.

Program counter control device 122A selects one of the branch destination addresses set by the method described above in a way that uses the selection circuit 155, and sets the selected branch destination address in the next value NPC151 of the program counter.

Figure 10:
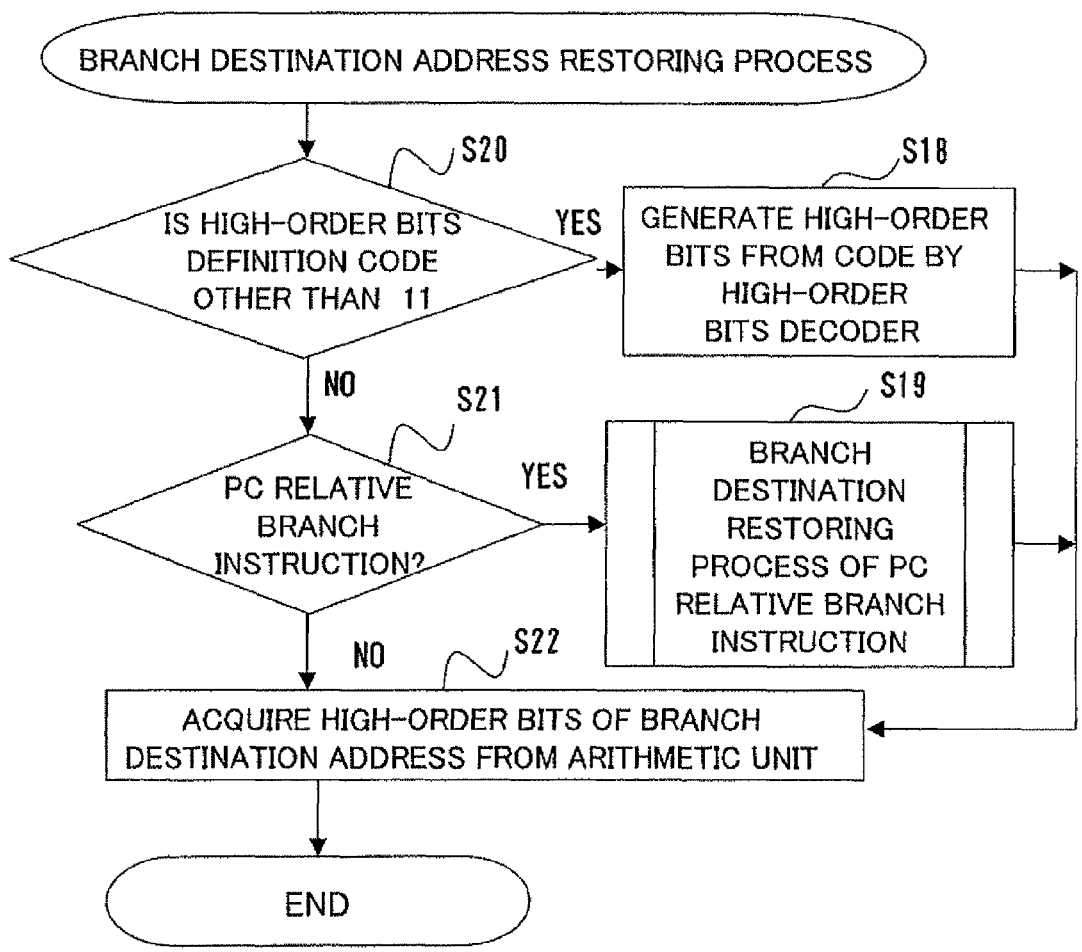
FIG. 10 is a diagram illustrating a branch destination restoring process.

FIG. 10 shows a flow of a branch destination address restoring process. When the high-order 32-bits definition code is 00(b), 01(b) or 11(b) (S20), with respect to the high-order 32-bits, a value into which the high-order 32-bits definition code inputted from the branch reservation station 126 is restored by the high-order bits decoder 150A, is set in the high-order 32-bits of the next value NPC151 of the program counter (S18). When notified of a signal showing a purport that the high-order 32-bits definition code is 10(b) and that the branch instruction is the PC relative branch instruction (S21), with respect to the high-order 32-bits, a value into which the high-order 32-bits of the present value PC152 of the program counter are added or subtracted by the adder-subtracter 154, is set in the high-order 32-bits of the next value NPC151 of the program counter (S19). When notified of a signal showing a purport that the high-order 32-bits definition code is 10(b) and that the branch instruction is the register indirect branch instruction, a value inputted from the operation unit 167, which has calculated the branch destination address of the register indirect branch instruction, is set in the high-order 32-bits of the next value NPC151 of the program counter (S22).

Invariably when the branch instruction is executed, TGT_PC<31:0> inputted from the branch reservation station 126 is set in the low-order 32-bits of the next value NPC151 of the program counter.

Note that if the branch instruction is not executed, the program counter control device 122A advances the next value NPC151 <63:0> of the program counter by the number of the simultaneously-completed instructions (a total sum of the respective instruction lengths). For example, when the 4 instructions are simultaneously completed and if a length of one instruction length is on the order of 4 bytes, the total sum is given such as: 4 bytes×4 instructions 16 bytes.

(Instruction Fetch Control Unit)

The instruction fetch control unit 123 includes a high-order bits encoder 153A (corresponding to an encoding unit) that translates the high-order 32-bits of the address into the high-order 32-bits definition code, a selection circuit 161 that selects an output of the high-order bits encoder 153A and the high-order 32-bits definition code sent from the branch reservation station 126, a buffer IARX162 that retains a signal transmitted from the selection circuit 161, an address adder 184 that receives an input of the instruction address of the instruction in the process of being fetched, a buffer SEQ163 that retains an output of the address adder 184, a buffer TIAR164 stored with a next branch destination address predicted in the branch prediction apparatus 100, a selection circuit 165 that selects any one of plural pieces of instruction address data (the high-order 32-bits definition code and the low-order 32-bits address) retained in the buffer IARX162, the buffer SEQ163, the buffer TIAR164, etc., an instruction fetch address retaining circuit 166 that retains the instruction address data selected by the selection circuit 165, and a high-order bits decoder 150B that generates the high-order 32-bits address from the high-order 32-bits definition code for fetching the instruction.

As in FIG. 5, the high-order bits encoder 153A encodes the high-order 32-bits PC<63:32> of the present value PC152 of the program counter into the high-order 32-bits definition code. The selection circuit 161 selects the encoded high-order 32-bits definition code and sets the selected code in the buffer IARX162. The buffer IARX162 is a buffer used when fetching the instruction in response to a fetch request given from the program counter.

When the fetch request is given from the program counter, the selection circuit 165 selects the instruction address data (the high-order 32-bits definition code and the low-order 32-bits address) output from the buffer IARX162, and sends the high-order 32-bits definition code to the high-order bits decoder 150B and to the branch prediction apparatus 100.

Further, in this case, the selection circuit 165 sends the low-order 32-bits address output from the buffer IARX162 to the instruction fetch address retaining circuit 166 and to the branch prediction apparatus 100.

The high-order bits decoder 150B translates the high-order 32-bits definition code into the high-order 32-bits address. The high-order 32-bits address is attached to the low-order 32-bits address (corresponding to a line explicitly indicated by IF-EAG<31:0> within the branch prediction apparatus 100) passing through within the branch prediction apparatus 100, and is thus used as a 64-bits instruction address IF-EAG<63:0> for fetching the instruction (arrowhead 190).

Moreover, the low-order 32-bits IF-EAG<31:0> of the instruction address is inputted to the address adder 184, wherein the address is incremented by one unit and is thus stored in the buffer SEQ163. Herein, "one unit" represents a numeric value used when the address on the main storage device 121 is advanced by the number of the instructions acquired from the memory (the main storage device 121 or the instruction cache 102) at the single fetch stage. For example, in the case of fetching the 32-bytes 8 instructions at the single fetch stage, one unit is 32 bytes. Further, the present high-order 32-bits definition code is set directly as the high-order 32-bits definition code of the buffer SEQ163.

Accordingly, the selection circuit 165 selects, based on a condition that the branch instruction is not executed, the instruction address data (the high-order 32-bits definition code and the low-order 32-bits address) output from the buffer SEQ163. The selected instruction address data given from the buffer SEQ163 is processed in the same way as the instruction address data from the buffer IARX162 is processed.

Further, in the branch prediction apparatus, when the branch instruction is hit with the now-being-fetched instruction address and if the branch to this branch destination address is predicted, the branch prediction apparatus 100 sends the instruction address data (the high-order 32-bits definition code and the low-order 32-bits address) of the branch destination to the buffer TIAR164.

In this case, under such a condition that the branch prediction apparatus 100 sends the branch prediction, the selection circuit 165 selects the instruction address data output from the buffer TIAR164. The instruction address data given from the buffer TIAR164 is processed in the same way as the instruction address given from the buffer IARX162 is processed.

(Operation Unit)

The operation unit 167, when the instruction fetched under the control of the instruction fetch control unit 123 is the register indirect branch instruction, calculates the branch destination address of the fetched instruction. The calculated branch destination address is sent to the branch reservation station 126. The high-order 32-bits address of this branch destination address is translated into the high-order 32-bits definition code by the high-order bits encoder 153B. Note that the high-order 32-bits of the branch destination address calculated by the operation unit 167 are sent via the selection circuit 169 to the program counter control device 122A.

The relative address operation unit 168, when the instruction fetched under the control of the instruction fetch control unit 123 is the relative address branch instruction, calculates an address shifted by an amount of the relative address on the basis of the low-order 32-bits PC<31:0> of the instruction fetch address retaining circuit 166 that retains the address equivalent to the instruction address of the branch instruction. The thus-calculated branch destination address is sent to the branch reservation station 126 via the selection circuit 169.

Further, the relative address operation unit 168 detects occurrence of a digit overflow (the digit overflow in the positive direction: +1, and the digit overflow in the negative direction: −1) when calculating the address shifted by the relative address from the program counter value (the present instruction fetch address). The program counter control device 122A is notified of the detected digit overflow as the digit overflow information (+1, −1) via the branch reservation station 126.

Moreover, the relative address operation unit 168 receives an input of the present high-order 32-bits definition code from the instruction fetch address retaining circuit 166. If the digit overflow is not detected, the high-order 32-bits definition code inputted from the instruction fetch address retaining circuit 166 is set as it is in the buffer 171. Moreover, whereas if the digit overflow is detected, the high-order 32-bits definition code of the branch destination address is calculated based on the high-order 32-bits definition code inputted from the instruction fetch address retaining circuit 166. When the digit overflow in the positive direction occurs, the high-order 32-bits definition codes shift in the positive direction and become such as 00(b)→01(b), 01 (b)→10 (b), 10 (b)→10 (b), 11(b)→00 (b). At this time, both of 01(b) and 10 (b) shift to 10(b). When the digit overflow in the negative direction occurs, the high-order 32-bits definition codes shift in the negative direction and become such as 00(b)→11(b), 01(b)→00(b), 10(b)→10(b), 11(b)→10(b). At this time, both of 11(b) and 10(b) shift to 10(b).

The selection circuit 169 selects, corresponding to whether the branch instruction is the relative address branch instruction or the register indirect branch instruction, a result of the address calculation of any one of the relative address operation unit 168 and the operation unit 167.

(Branch Reservation Station)

The branch reservation station 126 includes the selection circuit 169, a buffer 170 and a buffer 171. The branch reservation station 126 retains the branch destination address calculated by the relative address operation unit 168 or the operation unit 167 in the buffers 170, 171, and adjusts branch execution timing.

The buffer 170 is stored with the now-being-fetched instruction address data (which is the branch source address when the instruction to be fetched is the branch instruction) supplied from the instruction fetch address retaining circuit 166. The branch destination address data contains the high-order 32-bits definition code and the low-order 32-bits address.

Further, the buffer 171 is stored with the branch destination address data (which is the address calculated by the operation unit 167 or the address calculated by the relative address operation unit 168) selected by the selection circuit 169. The branch destination address data contains the high-order 32-bits definition code and the low-order 32-bits address.

The branch instruction (the register indirect branch instruction or the PC relative branch instruction) is processed by the operation unit 167 or the relative address operation unit 168, and, when the branch destination address is determined, the branch source address is sent to the branch prediction apparatus 100 from the buffer 170. Moreover, at this time, the branch destination address is sent to the branch prediction apparatus 100 from the buffer 171.

(Branch Prediction Apparatus)

The branch prediction apparatus 100 is stored with, as a branch history, the branch destination address of the branch instruction (the PC relative branch instruction or the register indirect branch instruction) of which the branch execution is determined by the branch reservation station 126. The branch prediction apparatus 100 includes the branch history storage device 130 (corresponding to a history storage unit), a matching circuit 180 and a selection circuit 183. Note that the branch prediction apparatus 100 may be, in addition to simply storing the branch instruction of which the branch execution is determined, stored with the branch destination address of the branch instruction predicted to be branched next time on the basis of a branch history (which is a so-called global (branch) history (GBH)) of the branches conducted a plural number of times.

The branch history storage device 130 is a storage device in a set associative system. A set in the branch history storage device 130 is specified by a portion (e.g., <15:5>) (from the 15th bit to the 5th bit) of the branch source address of the branch instruction.

A way within the set is determined by tags stored in a tag field 130A. The tag field 130A is stored with the high-order 32-bits definition code of the branch source address and a portion (e.g., <31:16>) (from the 31st bit to the 16th bit) of the low-order 32-bits address.

On the other hand, a data field 130B associated with the tag field is stored with the high-order 32-bits definition code of the branch destination address and the low-order 32-bits address.

Further, the branch prediction apparatus 100, when reading from the branch history storage device 130, acquires the now-being-fetched instruction address (the branch source address) via the selection circuit 165. Then, the branch prediction apparatus 100 determines the relevant set, and further searches the tag field 130A within the set. Subsequently, the branch prediction apparatus 100 checks, with the aid of the matching circuit 180, whether the high-order 32-bits definition code and the portion (e.g., <31:16>) of the low-order address stored in the tag field 130A are coincident with those acquired from the selection circuit 165.

The high-order 32-bits definition code and the portion (e.g., <31:16>) of the low-order address are inputted to one input of the matching circuit 180 via an FF 182. The tags (the high-order 32-bits definition code of the branch source address of the branch instruction predicted in the past to be branched next time and the portion (e.g., <31:16>) of the low-order address), are inputted to the other input of the matching circuit 180.

Accordingly, if the high-order 32-bits definition code associated with the now-being-fetched instruction address and the portion (e.g., <31:16>) of the low-order address are coincident with the contents of the tag field 130A, it follows that the branch prediction is to be hit.

When the matching circuit detects that the branch prediction is hit, a signal showing the hit is transmitted to the selection circuit 183. The selection circuit 183 sends the instruction address data (the high-order 32-bits definition code and the low-order 32-bits address) of the branch destination to the buffer TIAR164 of the instruction fetch control unit from a data field 130B associated with a hit entry in the tag field 130A. With this operation, it follows that a next instruction fetch is executed based on the branch prediction.

(High-Order Bit Decoder)

Figure 6:
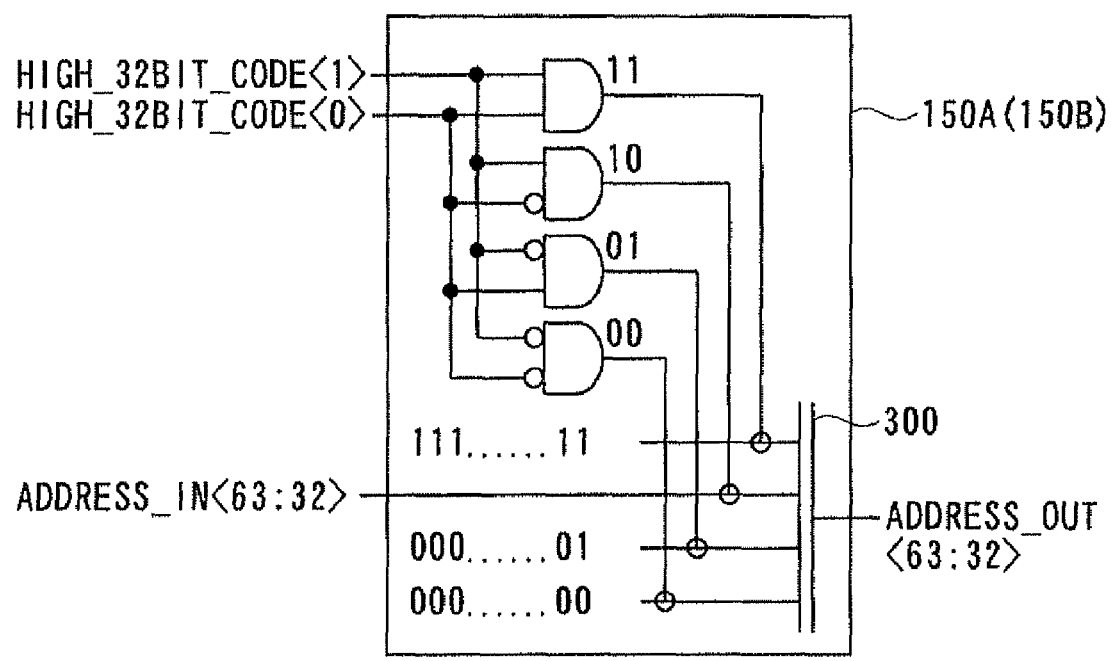
FIG. 6 is a diagram illustrating a circuit configuration of a high-order bits decoder.

FIG. 6 shows a circuit configuration of the high-order bits decoders 150A (and 150B). Each of the high-order bits decoders 150A (and 150B) restores the high-order 32-bits address when the high-order 32-bits definition codes are 00(b), 01(b) and 11(b).

Each of the high-order bits decoders 150A, 150B can be built up by a combination of a selector 300, four pieces of AND gates and an inverter. It is noted that, in FIG. 6, the inverter is marked with a circle on the side of an input terminal of the AND gate. Herein, this type of gate incorporating the inverter on the input side is also called the AND gate.

The high-order 32-bits definition code (indicated by HIGH_32BIT_CODE<1> and <0> in FIG. 6) is inputted to each AND gate. The AND attached with a label "11" comes to have a HI output when the high-order 32-bits definition code<1:0>=11(b).

Similarly, the AND attached with a label "10" comes to have the HI output when the high-order 32-bits definition code<1:0>=10(b). Further, the AND attached with a label "01" comes to have the HI output when the high-order 32-bits definition code<1:0>=01(b). Moreover, the AND attached with a label "00" comes to have the HI output when the high-order 32-bits definition code<1:0>=00(b).

In the other hand, the selector 300, when each AND gate is turned ON, outputs an input signal of a corresponding portion. Registers stored with three pieces of fixed data (0xFFFFFFFF, 0x0000001 and 0x00000000) and the high-order 32-bits address itself (ADDRESS_IN<63:32>) are connected to the input side of the selector 300.

To be specific, the AND attached with the label "11" is turned ON, thereby outputting such a bit pattern (0xFFFFFFFF) that the high-order 32-bits are all "1". Further, the AND attached with the label "01" is turned ON, thereby outputting such a bit pattern (0x00000001) that the least significant bit of the high-order 32-bits is "1", while the remaining bits are "0". Still further, the AND attached with the label "00" is turned ON, thereby outputting such a bit pattern (0x00000000) that all of the high-order 32-bits are "0". Yet further, the AND attached with the label "10", is turned ON, thereby outputting the high-order 32-bits address itself.

(High-Order Bits Encoder)

Figure 7:
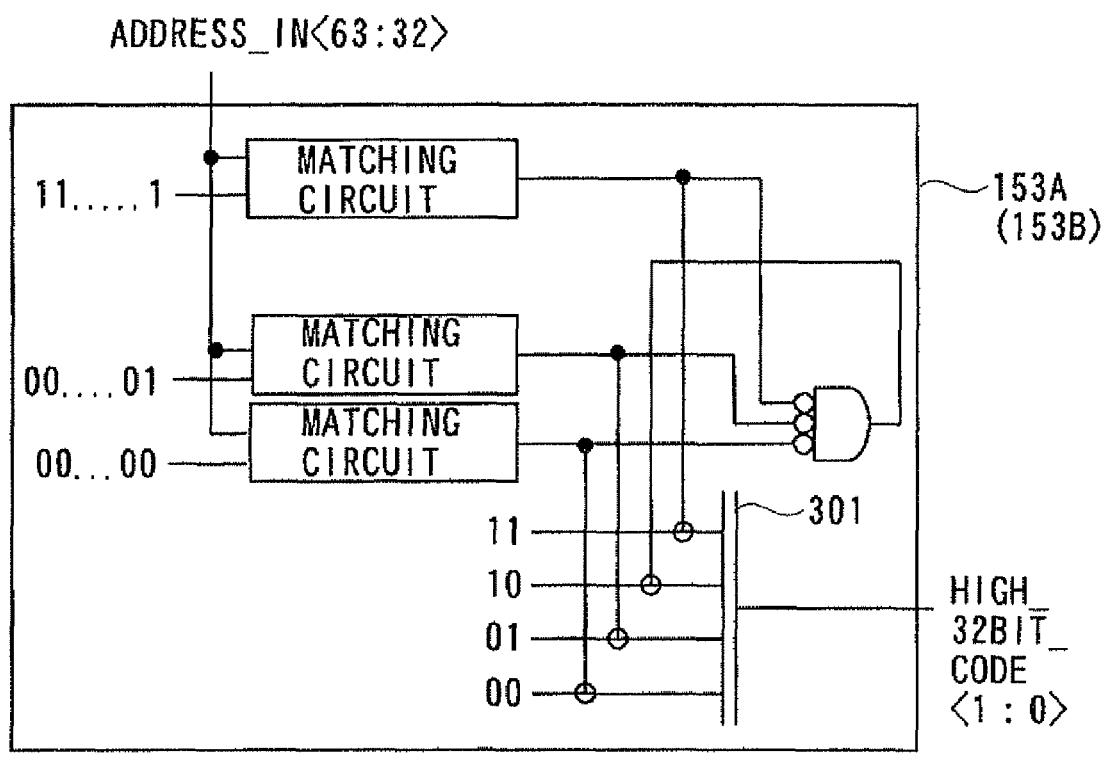
FIG. 7 is a diagram illustrating a configuration of a high-order bits encoder.

FIG. 7 shows a configuration of the high-order bits encoder 153A (153B). The high-order bits encoder receives an input of the high-order 32-bits address (indicated by ADDRESS_IN<63:32> in FIG. 7) and outputs the high-order 32-bits definition code (HIGH_32BITCODE<1:0> in FIG. 7).

As in FIG. 7, the high-order bits encoder 153A (153B) includes three matching circuits that determine whether or not the input data is matched with 32-bits patterns such as "111 . . . 11" (all of the bits are "1", i.e., 0xFFFFFFFF), "000 . . . 01" (the least significant bit is "1", while all of the remaining bits are "0", i.e., 0x00000001) and "000 . . . 00" (all of the bits are "0", i.e., 0x00000000), and a selector 301 that outputs the 2 bits such as "11", "10", "01" or "00" corresponding to an output of the matching circuit showing the matched input data.

(Processing Sequence)

A processing sequence executed by the components described above will be explained with reference to flowcharts in FIGS. 8 through 11. The processing sequence is, though herein illustrated in the flowcharts, basically realized by hardware logic circuits.

Figure 8:
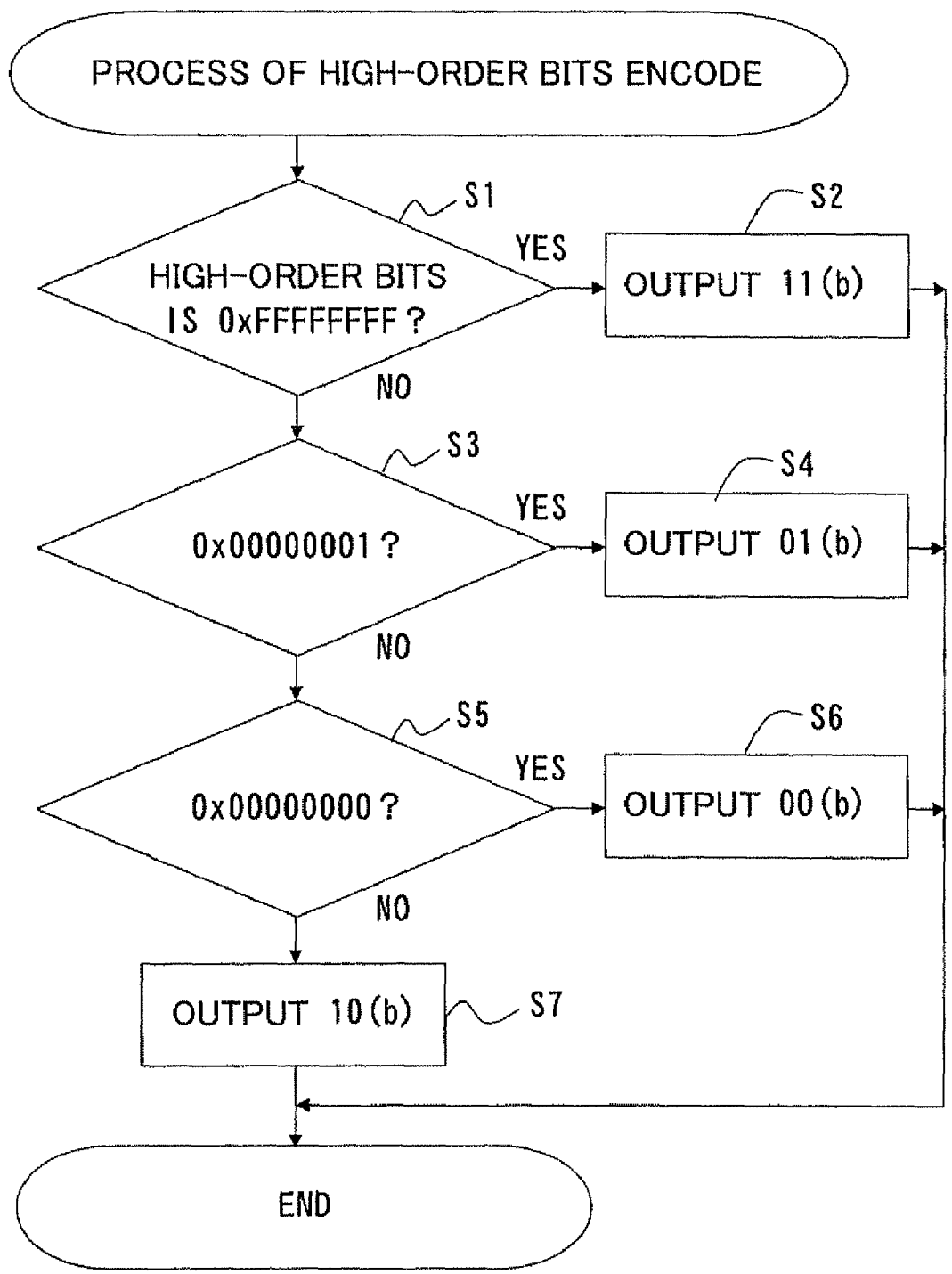
FIG. 8 is a diagram illustrating a processing sequence of the high-order bits encoder.

FIG. 8 shows the processing sequence of the high-order bits encoder. The high-order bits encoder determines whether or not the high-order 32-bits address is matched with "0xFFFFFFFF", "0x00000001" or "0x00000000" (S1, S3, S5).

When the high-order 32-bits address is matched with "0xFFFFFFFF", the high-order bits encoder outputs the 2 bits 11(b) (S2).

Further, when the high-order 32-bits address is matched with "0x00000001", the high-order bits encoder outputs the 2 bits 01(b) (S4).

Still further, when the high-order 32-bits address is matched with "0x00000001", the high-order bits encoder outputs the 2 bits 00(b) (S6).

Then, if the high-order 32-bits address is matched with none of "0xFFFFFFFF", "0x00000001" and "0x00000000" the high-order bits encoder outputs the 2 bits 10(b).

Figure 9:
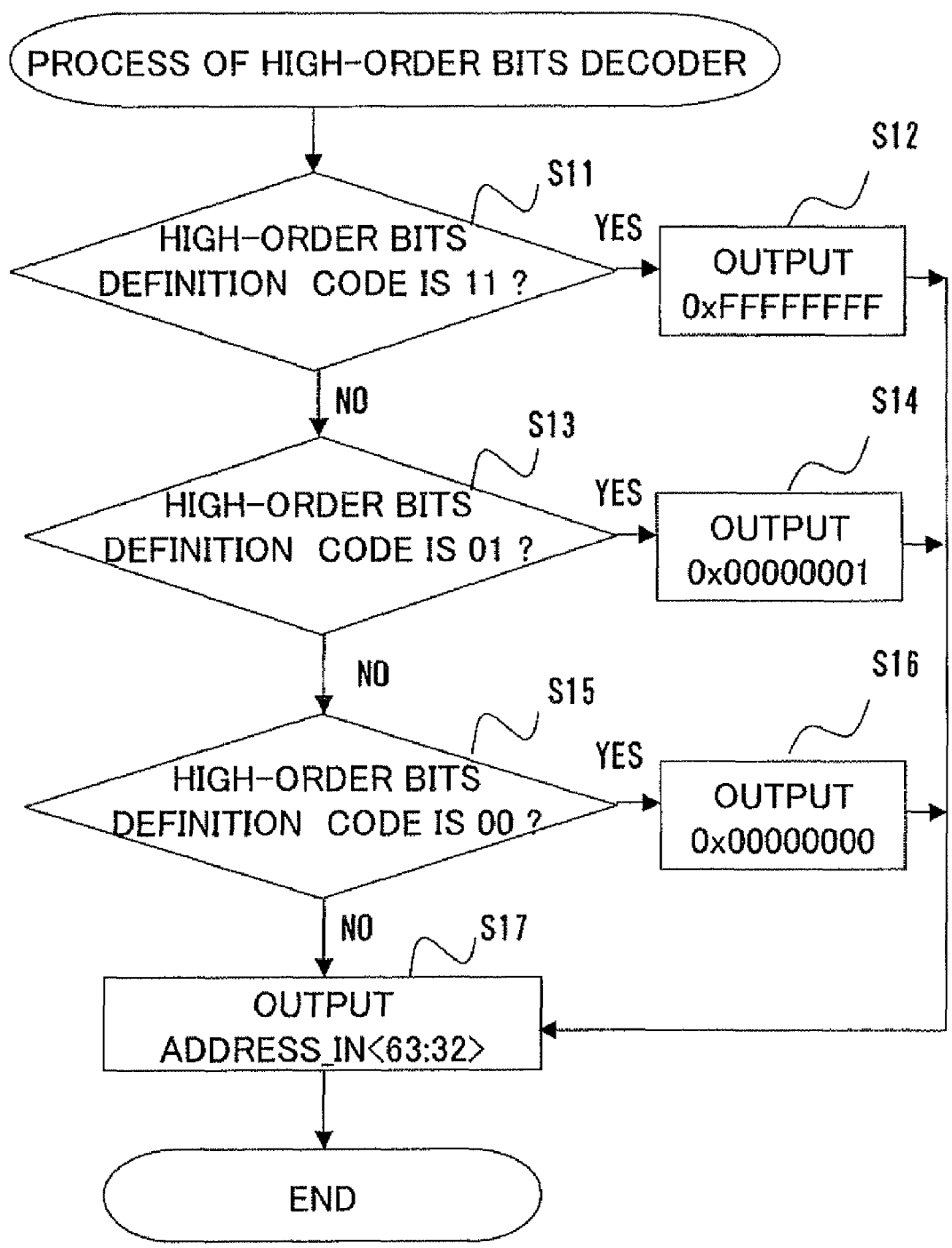
FIG. 9 is a diagram illustrating a processing sequence of the high-order bits decoder.

FIG. 9 shows the processing sequence of a high-order bits decoder. The high-order bits decoder determines whether the high-order 32-bits definition code (2 bits) matches with 11(b), 01(b) or 00(b) (S81, S13, S15).

When the high-order 32-bits definition code is 11(b), the high-order bits decoder outputs 1 . . . 11 (all of the bits are "1", i.e., 0xFFFFFFFF) (S12).

When the high-order 32-bits definition code is 01(b), the high-order bits decoder outputs 0 . . . 01 (the bits other than the least significant bit are "0", i.e., all of the bits are "1", i.e., 0x00000001) (S14).

When the high-order 32-bits definition code is 00(b), the high-order bits decoder outputs 0 . . . 00 (all of the bits are "0", i.e., 0x00000000) (S16).

The high-order 32-bits definition code, if not applied to those given above, becomes 10(b). In this case, the high-order bits decoder outputs the inputted 32-bits address and the high-order 32-bits of the present value PC152 of the program counter in the present embodiment (S17).

As described above, according to the processor in the present embodiment, in the 64-bits address space, the high-order 32-bits addresses are classified into the high-order 32-bits definition codes of the 2 bits such as 00(b), 01(b), 11(b) and 10(b). Then, the history of the branch instruction is stored based on the combinations of the high-order 32-bits definition codes and the low-order 32-bits addresses, and the branch prediction is carried out.

Accordingly, with respect to the OS control that allocates the kernel, the execution format of the user process and the stack/library in distribution in the 64-bits address space, if there is the uneven distribution in the use of the high-order 32-bits address, the branch prediction can be efficiently realized.

To be specific, in the high-order 32-bits definition codes, 00(b), 01(b) and 11(b) are allocated to the frequently occurring address range, while 10(b) is allocated to the rarely occurring address range. According to this type of definitions of the high-order 32-bits definition codes, when the branch destination address falls within the high-order 32-bits range, as a matter of course, the result of the correct branch prediction can be obtained even if the branches occur mutually among the address spaces in which the high-order 32-bits of the branch destination are classified into 00(b), 01(b) and 11(b). Therefore, the branch history can be effectively utilized except that the high-order 32-bits of the branch destination are classified into 10(b) (other cases).

Further, in the case of the PC relative branch instruction, the branch destination address is restored from the present value PC152 of the program counter, whereby the branch destination address can be calculated at the stage of detecting the digit overflow before determining the arithmetic result of the relative address operation unit 168.

What is claimed is:
1. A processor comprising:
a fetching unit to fetch instructions at a fetching stage of said processor that repeats an execution cycle including at least the fetching stage for fetching the instructions from an instruction storage source and an execution stage for processing the instructions;

an address control unit to determine an instruction address defined as a storage source of the instruction fetched by said fetching unit;

a branch instruction predicting unit to predict, based on history information of the instructions processed in the past, whether the instruction processed by said processor at a next execution stage is a branch instruction or not; and an execution unit to process at least one of the fetched instructions at the execution stage, said address control unit including:

an encoding unit to compress a high-order bit field among said high-order bit field and a predetermined low-order bit field each contained in the instruction address into high-order compressed address information, at least a bit pattern among bit patterns of the high-order compressed address information being decompressible into an original bit pattern of the high-order bit field, by segmenting the high-order bit field into a plurality of address ranges to generate first high-order address information for identifying a first segmented address range and second high-order address information for identifying an address ranges excluding the first segmented address range; and a decompressing unit to decompress the first high-order address information into the high-order bit field associated with the first segmented address range when the branch instruction is a branch instruction to branch to the first segmented address range identified by the first high-order address information, and to restore the high-order bit field corresponding to a type of the branch instruction when the branch instruction is a branch instruction to branch to an address range identified by the second high-order address information, said branch instruction predicting unit including a history storage unit to store a compressed address which includes a combination of the high-order compressed address information and the low-order bit field as history information associated with a branch destination address of the processed branch instruction in any one of a plurality of storage locations determined from the high-order compressed address information and the low-order bit field associated with the instruction address of the storage source of the branch instruction.

2. A processor according to claim 1, wherein said address control unit includes:

a branch type information receiving unit to receive from said execution unit a signal for identifying a type of the branch instruction if the branch instruction is the branch instruction branching to the address range identified by the second high-order address information;

a digit overflow information receiving unit to receive digit overflow information showing occurrence of a digit overflow in a positive direction or in a negative direction from the range of the low-order bit field in a process of the branch instruction by said execution unit if the branch instruction is a relative branch instruction relatively branching from a branch source address in a way that sets the range of the low-order bit field as a limit; and an operation unit to acquire the high-order bit field of the branch destination address by addition or subtraction to or from the high-order bit field of the branch source address if the digit overflow occurs.

3. A processor according to claim 2, wherein said address control unit includes a high-order bit acquiring unit to acquire the high-order bit field of the branch destination address from said execution unit that has calculated the branch destination of the branch instruction if the signal received by said branch type information receiving unit does not show the relative branch instruction.

* * * * *